United States Patent [19]

Anderson

[11] Patent Number: 5,575,951
[45] Date of Patent: Nov. 19, 1996

[54] LIQUID STABILIZER COMPRISING METAL SOAP AND SOLUBILIZED METAL PERCHLORATE

[75] Inventor: Donald F. Anderson, North Brunswick, N.J.

[73] Assignee: Akcros Chemicals America, New Brunswick, N.J.

[21] Appl. No.: 418,057

[22] Filed: Apr. 6, 1995

Related U.S. Application Data

[63] Continuation-in-part of Ser. No. 48,601, Apr. 16, 1993, abandoned.

[51] Int. Cl.$^6$ ............................. C09K 15/32; C08K 5/09
[52] U.S. Cl. ............................ 252/400.1; 252/400.61; 524/399; 524/400; 524/402
[58] Field of Search ....................... 524/395, 399, 524/400, 386, 436; 252/400.1, 400.52, 400.61

[56] References Cited

U.S. PATENT DOCUMENTS

| | | | |
|---|---|---|---|
| 3,928,267 | 12/1975 | Rhodes et al. | 260/23 X |
| 4,178,282 | 12/1979 | Bae | 240/45.75 W |
| 4,659,764 | 4/1987 | Isao et al. | 524/399 |
| 4,803,001 | 2/1989 | Camenzind et al. | 252/47 |
| 4,861,816 | 8/1989 | Kobayashi et al. | 524/204 |
| 4,957,954 | 9/1990 | Iizuka et al. | 524/102 |
| 4,992,183 | 2/1991 | Beimesch et al. | 252/32.7 E |
| 5,004,776 | 4/1991 | Tadenuma et al. | 524/377 |
| 5,034,443 | 7/1991 | Bae et al. | 524/180 |
| 5,191,007 | 3/1993 | Zelazny et al. | 524/336 |
| 5,310,805 | 5/1994 | Igarashi et al. | 525/239 |
| 5,321,090 | 6/1994 | Nakatsuji et al. | 525/221 |
| 5,322,872 | 6/1994 | Quinn | 524/399 |
| 5,376,707 | 12/1994 | Nakatsuji et al. | 524/27 |
| 5,432,222 | 7/1995 | Igarashi et al. | 524/400 |
| 5,464,896 | 11/1995 | Nosu et al. | 524/436 |
| 5,518,662 | 6/1996 | Bae et al. | 252/400.1 |

OTHER PUBLICATIONS

Derwent Patent Abstract No. 92-265666/32, abstracting Japanese Patent Publication No. 04/183,735 (published Jun. 30, 1992).
Chemical Abstracts, vol. 117, No. 49,957r (1992).
Chemical Abstracts, vol. 107, No. 8300w (1987).
Metal–Based Lubricant Compositions by Henry M. Drew (Noyes Data Corporation, Park Ridge, NJ, 1975), pp. 3–6.
Whittington's Dictionary of Plastics by Lloyd R. Whittington (Technomic Publishing, Stamford, CT, 1968), p. 197.
"Reducing PVC Discoloration", by S. D. Brilliant et al., Plastics Compounding, Jul./Aug. 1992, pp. 32 and 34.

*Primary Examiner*—Tae Yoon
*Attorney, Agent, or Firm*—Richard P. Fennelly; Louis A. Morris

[57] ABSTRACT

A homogeneous, clear liquid stabilizer suitable for use in a vinyl chloride polymer comprising a liquid mixture of metal soap stabilizer, for example, a mixture of a mixed barium/zinc soap stabilizer and solubilized metal perchlorate, for example, a barium perchlorate. The liquid stabilizer is formed by combining a solubilized metal perchlorate and a liquid mixture of the metal soap stabilizer.

18 Claims, No Drawings

LIQUID STABILIZER COMPRISING METAL SOAP AND SOLUBILIZED METAL PERCHLORATE

This is a continuation-in-part application of U.S. Ser. No. 08/048,601, filed Apr. 16, 1993 abandoned.

BACKGROUND OF THE INVENTION

Vinyl halide polymers, particularly polyvinyl chloride resins, are used in a variety of applications. These thermoplastic polymers can be fabricated into useful articles by extrusion, injection molding, compression molding and other thermoforming methods. To stabilize vinyl halide polymers during thermoforming methods, heat or thermal stabilizers and co-stabilizers are added to the resins. Examples of known stabilizers include organometallic stabilizers, mixed metallic stabilizers, and inorganic stabilizers. Metallic stabilizers include heavy metal, alkali metal and alkaline earth metal salts of fatty acids. The heavy metals include lead, cadmium, tin and zinc. Examples of mixed metallic stabilizers include fatty acid salts of zinc and calcium, zinc and barium, barium and cadmium, lead and barium, or two or more of other metals. Examples of inorganic stabilizers include lead carbonate, lead sulfate, and mixtures of tribasic lead sulfate and dibasic lead stearate. Examples of organic, non-metallic stabilizers or co-stabilizers include epoxidized soybean oil, tris nonylphenyl phosphite, beta diketones, and phenylindole.

Stabilization of polyvinyl chloride has also been addressed in cases where organic nitrogen-induced degradation becomes a problem such as in applications in which polyvinyl chloride is affixed to a urethane foam backing. The residual amine catalyst in the polyurethane is the degradation catalyst.

Among the references pertinent to this general area of technology are the following:

1. U.S. Pat. No. 5,034,443 to K. Bae et al. describes stabilizer compositions which are free-flowing powder compositions and which contain blends of sodium perchlorate hydrate and calcium silicate. This patent also describes a solution of sodium perchlorate in water with calcium silicate and a non-absorbing diluent powder, such as calcium carbonate, to provide a "free-flowing powder composition".

2. U.S. Pat. No. 4,861,816 to M. Kobayashi describes a solid stabilizer mixture of a barium salt of a carboxylic acid and a zinc salt of a carboxylic acid, each having a melting point of no lower than 250° C., with a metal perchlorate and/or perchlorate ion type hydrotalcite compound.

3. U.S. Pat. No. 4,957,954 to S. Iizuka et al. describes a stabilizer comprising a 2,2,6,6-tetramethyl piperidinyl compound and an ammonium or metal perchlorate.

4. Japanese Patent Publication No. 61/272,258 describes heat stabilizers containing a predominant amount of organic tin compounds with lower amounts of hydrotalcites and still generally lower levels of barium perchlorate.

5. Japanese Patent Publication No. 04/50,250 describes solid powder stabilizers comprising Group IA metal salts of perchloric acid, hydrotalcite and/or zeolites, and organic powder.

6. Japanese Patent Publication No. 04/183,735 describes use of compositions comprising organic acid salt(s) of (1) sodium, potassium, magnesium, calcium, barium, and zinc and alkyltin compounds; (2) sulpholene compounds; and (3) β-diketone compounds of a certain formula or their sodium, magnesium, calcium, barium or zinc salts.

Tadenuma and co-workers in U.S. Pat. No. 5,004,776 describe stabilized chlorine-containing resin compositions which contain a stabilizer consisting essentially of: (a) an overbased alkaline earth metal carboxylate or phenolate complex; (b) zeolite; (c) calcium hydroxide; and (d) a perchlorate-alcohol complex. This overall stabilizer would not be expected to be a clear, homogeneous liquid since components (b) and (c) are solids. While it is true that this patent shows the synthesis of liquid perchlorate-containing additives, (d), such a component is not taught for use with a solubilized metal perchlorate in a stabilizer composition which is a homogeneous, clear liquid, but is only taught for use with zeolite and calcium hydroxide as additional, necessary stabilizer additives. This patent also fails to show mixing of components (a) and (d) only in any form of premix.

SUMMARY OF THE INVENTION

A liquid stabilizer suitable for use in a vinyl chloride polymer comprising a homogeneous, clear liquid mixture of at least one metal soap stabilizer and a solubilized metal perchlorate. The liquid stabilizer is formed by combining a solubilized metal perchlorate and a liquid mixture of at least one metal soap stabilizer. The stabilizer composition of this invention can be used at from about 0.5 weight part to about 10 weight parts per 100 parts by weight of polyvinyl chloride. It provides excellent protection against thermal degradation and coloration when exposed to polyurethane foam.

DESCRIPTION OF PREFERRED EMBODIMENTS

One major component of the composition of the present invention is what might be termed a "metal soap stabilizer" component. Such compositions are known to persons of ordinary skill in the art and comprise one or more metal salts of a carboxylic acid. For example, there can be used salts of saturated and unsaturated carboxylic acids having up to 22 carbon atoms, especially up to 18 carbon atoms. Optionally, these acids are linear or branched and can be cycloaliphatic or aromatic. For example, the carboxylic acid salts can be based on Group IA metals such as sodium or potassium; Group IIA metals such as barium, calcium or magnesium; Group IIB metals such as zinc, or less preferably cadmium, and Group IIIA metals such as aluminum. Optionally, several of these carboxylates can be present as overbased complexes, with oxygen (acid deficient) in the case of zinc and aluminum and with carbon dioxide (carbonated) in the case of calcium, barium and magnesium. Preferably used acids are 2-ethylhexanoic acid, para-t-butyl benzoic acid, toluic acids, oleic acid, benzoic acid, tall oil acid, lauric acid, neo-decanoic acid, isooctanoic acid, iso-nonanoic acid and iso-stearic acid. Some metals are also optionally present as salts of phenol or substituted phenols. A further option is that these salts are also present in their carbonated form. Metals such as barium, calcium and magnesium are in this category and example phenols are phenol, para-octyl phenol, para-nonyl phenol, para-n-dodecyl phenol, dinonyl phenol, sec-butyl phenol and n-pentyl phenol. These metal salts are generally used in the form of mixtures of two or more of them.

The second major component is a solubilized metal perchlorate. The metal may be selected from metals from Group IA (e.g., sodium or potassium), Group IIA (e.g., barium or magnesium), Group IIIA (e.g., aluminum), Group IVA (e.g., tin or lead), or Group IIB (e.g., zinc or cadmium) of the Periodic Table of the Elements. Mixtures of such perchlorates can be used, if desired. Solubilization of the perchlorate is preferably achieved by using a relatively high boiling polar oxygenated solvent. Ethers and hydroxy-containing solvents meeting these requirements are representative. Representative solvents include tripropylene glycol, butylcarbitol, triethylene glycol, and butylene glycol.

Optionally, organophosphite esters can also be included in the composition. Materials representative of this class are triaryl phosphites such as triphenyl phosphite and tris (nonyl phenyl) phosphite; mixed alkyl aryl phosphites, such as diphenyl isodecyl phosphite, diphenyl isooctyl phosphite, phenyl di(isodecyl) phosphite, octylphenyl bis(iso-octyl) phosphite and trialkyl phosphites, such as tris(iso-octyl) phosphite, tris(isodecyl) phosphite, tris(iso-tridecyl) phosphite and tris(dipropylene glycol) phosphite. A further option is that acid phosphites, such as diphenyl phosphite, di(nonyl phenyl) phosphite and di(isooctyl) phosphite can be included in the composition.

Optionally, the composition can also contain conventional antioxidants. Representative of this class are distyrenated nonyl phenol, 2,6-di-t-butyl phenol, 2,2'-methylene bis (4-methyl-6-t-butyl phenol), 2,2'-bis-(4-hydroxyphenol) propane, octadecyl-3-(3',5'-di-t-butyl-4-hydroxy phenol) propionate, pentaerythritol tetrakis [3-(3', 5'-di-t-butyl-4-hydroxy phenol) propionate].

Lubricants such as oleic acid, lauric acid, isostearic acid, mineral oil, glycerol monooleate, glycerol mono-ricinoleate and butyl stearate are also optional constituents of the formulation.

Optionally, the composition can contain an organic costabilizer such as dibenzoyl methane, stearoyl benzoyl methane, isoamyl benzoyl methane or dehydroacetic acid.

Epoxidized esters or oils can constitute optional constituents of the composition.

Optionally, polyol costabilizers such as trimethylol propane, glycerol di (trimethyl propane) and pentaerythritol can also be present.

The relative weight amounts of mixed metal soap component to solubilized metal perchlorate component (metal perchlorate and solvent for the metal perchlorate) in the novel stabilizer of the present invention can range from about 400:1 to about 5:1, preferably from about 20:1 to about 5:1 on a weight basis, most preferably from about 10:1 to about 6:1.

The present invention is further understood by the Examples which follow.

Examples 1–7

| Constituent | Example Compositions | | | | | | |
|---|---|---|---|---|---|---|---|
| | 1 | 2 | 3 | 4 | 5 | 6 | 7 |
| BNP (24% Ba) | 74.0 | 73.7 | 73.0 | 72.3 | 71.3 | 74.0 | 72.3 |
| DPIDP | 17.0 | 17.0 | 17.0 | 17.0 | 17.0 | | |
| DPP | 3.0 | 3.0 | 3.0 | 3.0 | 3.0 | | |
| TPG | 6.0 | 5.3 | 4.0 | 2.7 | 0.7 | 6.0 | 2.7 |
| Ba(ClO$_4$)$_2$/ TPG (8.2% Ba) | | 1.0 | 3.0 | 5.0 | 8.0 | | 5.0 |
| Isodecanol | | | | | | 20.0 | 20.0 |

BNP (24% Ba) carbonated barium nonyl phenate (24% Ba)
DPIDP diphenyl isodecyl phosphite
DPP diphenyl phosphite
TPG tripropyleneglycol These Example compositions were prepared by sequentially charging the constituents (in the order listed) to a stirred beaker.

The solution of anhydrous barium perchlorate (20%) in tripropylene glycol was prepared by heating the stirred mixture to 80° C. for a sufficient time to completely dissolve the barium perchlorate.

The Example compositions were tested in the formulation given below which can be used for the production of plastisols for general use.

Formulation A—all amounts are given in phr.

| | |
|---|---|
| Emulsion polymerized PVC resin (Geon 121) | 100 |
| Dioctyl phthalate | 70 |
| Epoxidized soybean oil | 5 |
| Stabilizer | 4 |

The PVC formulations were mixed for ten minutes using a Premier Dispersator. The mixed formulations were spread on a clean glass plate using a plastisol draw-down knife. Films of 0.02" thickness were produced. The films were gelled in an oven preheated to 400° F. for a period of five minutes. After cooling to ambient temperature, the films were stripped from the glass substrate. Test specimens were then punched from these films with a hand held punch and mallet. These were then laid on glass strips placed on an oven tray. This tray was then placed in an oven preset to 380° F. for the duration of the heat stability test. Samples were removed from the oven at twenty minute intervals. Hunter 'L' values were then determined using an X-Rite 918 colorimeter. The results are shown in Table 1, below.

TABLE 1

| Example | Hunter 'L' Value After Oven Test In Minutes | | | | | |
|---|---|---|---|---|---|---|
| | 0 | 20 | 40 | 60 | 80 | 100 |
| 1 | 67.9 | 53.5 | 24.2 | 7.0 | 2.7 | 1.5 |
| 2 | 67.1 | 61.2 | 49.8 | 41.6 | 9.7 | 7.8 |
| 3 | 73.5 | 69.1 | 67.1 | 65.8 | 41.0 | 39.9 |
| 4 | 76.4 | 75.8 | 73.3 | 67.5 | 52.6 | 42.9 |
| 5 | 74.1 | 76.0 | 71.5 | 66.8 | 60.5 | 56.3 |
| 6 | 67.9 | 42.9 | 20.4 | 5.3 | 1.9 | |
| 7 | 73.0 | 70.5 | 57.4 | 43.7 | 41.1 | |

Note: Hunter color scale
L = 100 = White, L = 0 = black.

Examples 8 and 9

| Constituent | Example Compositions | |
|---|---|---|
| | 8 | 9 |
| BNP (28% Ba) | 32.3 | 32.3 |
| Cadmium tallate/octoate (15% Cd) | 62.7 | 62.7 |
| TPG | 5.0 | — |
| Ba(ClO$_4$)$_2$/TPG (8.2% Ba) | — | 5.0 |

BNP (28% Ba) — Carbonated barium nonylphenate (28% Ba)
Cadmium tallate/octoate (15% Cd) — mixed cadmium soaps of tall oil and 2-ethylhexanoic acids.

The Example compositions were prepared in the same fashion as described for Examples 1–7 and were then tested in the formulation given below.

Formulation B—all amounts are given in phr.

| | |
|---|---|
| Suspension polymerized PVC (sold as Geon 103EP): | 100.00 |
| Dioctyl phthalate: | 45.00 |
| Epoxidized soybean oil: | 5.00 |
| Stearic acid: | 0.25 |
| Calcium carbonate (filler): | 15.00 |
| Stabilizer: | 2.00 |

The PVC formulations were mixed by hand before being placed on an oil heated two-roll mill under the conditions described in Table 2. After the milling time, the gelled formulations were removed as sheets. Test specimens were punched from these sheets and subjected to an oven heat stability test as for Examples 1–7. In this case, the test temperature was 385° F. Samples were removed from the oven at ten minute intervals. Hunter 'b' values were then determined. The results are shown in Table 3.

TABLE 2

Mill Conditions

| | |
|---|---|
| Roll diameter | 6 in. |
| Roll temperatures | 340° F. |
| Front roll speed | 28 rpm |
| Back roll speed | 20 rpm |
| Nip thickness | 0.02 in. |
| Milling time | 3 min. |

TABLE 3

| Ex-amp. | Hunter 'b' Value After Oven Test In Minutes | | | | | | | | | |
|---|---|---|---|---|---|---|---|---|---|---|
| | 0 | 10 | 20 | 30 | 40 | 50 | 60 | 70 | 80 | 90 |
| 8 | 3.4 | 3.6 | 7.8 | 13.2 | 18.5 | 21.5 | 24.7 | 28.4 | 32.0 | 45.7 |
| 9 | 2.5 | 3.2 | 6.9 | 11.9 | 15.2 | 18.8 | 21.8 | 23.7 | 24.4 | 36.6 |

Note — Increasing 'b' value denotes increasing yellowness.

Examples 10 and 11

| | Example Compositions | |
|---|---|---|
| Constituent | 10 | 11 |
| DPIDP | 50 | 50 |
| DPP | 5 | 5 |
| Butyl Carbitol | 28.4 | 28.0 |
| TPG | 1.6 | |
| NaClO$_4$/TPG (2.7% Na) | | 2.0 |
| Calcium Octoate (6% Ca) | 15 | 15 |

Calcium Octoate (6% Ca) — neutral calcium 2-ethylhexanoate (6% Ca)

These formulations were, again, prepared by sequential charging of the listed constituents.

The solution of anhydrous sodium perchlorate in TPG was prepared by the same technique as that employed for the solution of barium perchlorate in the same solvent. This is described in Examples 1–7.

The Example compositions were tested in the formulation given below which can be used for the production of general purpose clear, flexible PVC sheet.

Formulation C

| | |
|---|---|
| Suspension polymerized PVC resin (Geon 103EP): | 100.0 |
| Dioctyl phthalate: | 45.0 |
| Epoxidized soybean oil: | 2.5 |
| Stearic acid: | 0.3 |
| Stabilizer: | 2.5 |

The PVC formulations were converted to sheets as described for Examples 8 and 9 and subjected to an oven heat stability test as described for Examples 1–7. The test temperature was 380° F. and samples were removed at ten minute intervals. Hunter 'b' values were recorded. The results are shown in Table 4.

TABLE 4

| | Hunter 'B' Value After Oven Test In Minutes | | | | | |
|---|---|---|---|---|---|---|
| Example | 0 | 10 | 20 | 30 | 40 | 50 |
| 10 | 3.9 | 11.8 | 59.8 | 77.9 | 92.5 | 99.9 |
| 11 | 3.4 | 6.4 | 26.4 | 42.8 | 58.7 | 80.2 |

Examples 12–15

| | Example Compositions | | | |
|---|---|---|---|---|
| Constituent | 12 | 13 | 14 | 15 |
| DPIDP | 35 | 35 | 35 | 35 |
| Basic Zinc Octoate (18% Zn) | 8.3 | 8.3 | 8.3 | 8.3 |
| Dibenzoyl Methane | 1.5 | 1.5 | 1.5 | 1.5 |
| BNP (12% Ba) | 37.5 | 37.5 | 37.5 | 37.5 |
| Oleic Acid | 4.0 | 4.0 | 4.0 | 4.0 |
| TPG | 7.2 | 4.8 | 2.4 | — |
| Butyl Carbitol | 6.5 | 5.9 | 5.3 | 4.7 |
| Ba(ClO$_4$)$_2$/TPG (8.2% Ba) | — | 3.0 | 6.0 | 9.0 |

Basic zinc octoate (18% Zn) — basic zinc 2-ethylhexanoate (18% Zn).
BNP (12% Ba) — Neutral barium nonylphenate (12% Ba).

These Example compositions were prepared as follows:

The zinc octoate was added to the DPIDP with stirring and heating to 160° F. Dibenzoyl methane was added and stirring continued until complete dissolution was achieved. Sequentially, were then charged, BNP, oleic acid, tripropylene glycol and butyl carbitol, ensuring that the reaction mixture was completely homogeneous prior to charging the next constituent. Finally, the Ba(ClO$_4$)$_2$/TPG solution was charged and stirring continued at 160° F. until a homogeneous solution was produced.

The Example compositions were tested in Formulation B which is suitable for the preparation of general purpose translucent PVC sheet. The PVC formulations were converted to sheets, specimens from which were subjected to an oven heat stability test. The test temperature was 370° F. and samples were removed from the oven at thirty minute intervals. Hunter 'b' values were measured and the results are shown in Table 5.

TABLE 5

| | Hunter 'B' Value After Oven Test In Minutes | | | | |
|---|---|---|---|---|---|
| Example | 0 | 30 | 60 | 90 | 120 |
| 12 | 3.1 | 4.3 | 6.8 | 9.8 | 21.5 |
| 13 | 2.0 | 3.6 | 4.5 | 7.4 | 19.2 |
| 14 | 2.2 | 3.1 | 4.5 | 7.0 | 16.8 |
| 15 | 1.6 | 2.6 | 4.1 | 7.5 | 25.2 |

Examples 16–20

| Constituent | \multicolumn{5}{c}{Example Compositions} |
|---|---|---|---|---|---|
| | 16 | 17 | 18 | 19 | 20 |
| DPIDP | 46.7 | 46.7 | 46.7 | 46.7 | 46.7 |
| Basic Zinc Octoate (18% Zn) | 10.0 | 10.0 | 10.0 | 10.0 | 10.0 |
| Dibenzoyl Methane | 1.6 | 1.6 | 1.6 | 1.6 | 1.6 |
| BNP (28% Ba) | 35.7 | 33.95 | 33.95 | 35.7 | 35.7 |
| TPG | 4.8 | — | — | — | — |
| $Ba(ClO_4)_2$/TPG (8.2% Ba) | — | 6.0 | — | — | — |
| $Ba(ClO_4)_2 \cdot 3H_2O$/TPG (8.2% Ba) | — | — | 6.0 | — | — |
| $NaClO_4$/TPG (2.7% Na) | — | — | — | 6.0 | — |
| $NaClO_4 \cdot H_2O$/TPG (2.7% Na) | — | — | — | — | 6.0 |
| Mineral Spirits | 1.2 | 1.75 | 1.75 | — | — |

These compositions were prepared in the same fashion as described for Examples 12–15. The tabulated list of constituents, again, represents the sequence of addition.

The hydrated perchlorate solutions were prepared by the technique described for the anhydrous analogues.

The Example compositions were tested in Formulation C. PVC specimens were subjected to an oven heat stability test at 370° F. Samples were removed from the oven at forty-five minute intervals. Hunter 'b' values were determined and are shown in Table 6.

TABLE 6

| | Hunter 'b' Values After Oven Test In Minutes | | | |
|---|---|---|---|---|
| Example | 0 | 45 | 90 | 135 |
| 16 | 3.3 | 5.7 | 13.1 | 21.8 |
| 17 | 3.4 | 5.1 | 9.0 | 14.2 |
| 18 | 3.4 | 5.1 | 8.9 | 13.3 |
| 19 | 3.0 | 5.4 | 9.5 | 14.5 |
| 20 | 3.1 | 5.0 | 10.8 | 14.2 |

Examples 21–24

| Constituent | \multicolumn{4}{c}{Example Compositions} |
|---|---|---|---|---|
| | 21 | 22 | 23 | 24 |
| DPIDP | 75.0 | 75.0 | 75.0 | 75.0 |
| Basic Zinc Octoate (22.5% Zn) | 4.2 | 4.2 | 4.2 | 4.2 |
| Butyl Carbitol | 6.3 | 6.1 | 8.8 | 8.8 |
| TPG | 6.2 | 5.4 | 3.0 | 3.0 |
| DPP | 5.0 | 5.0 | 5.0 | 5.0 |
| Barium Octoate (10% Ba) | 3.3 | 3.3 | | |
| $Ba(ClO_4)_2$/TPG (8.2% Ba) | — | 1.0 | 4.0 | |
| $Ba(ClO_4)_2 \cdot 3H_2O$/TPG (8.2% Ba) | | | | 4.0 |

Basic Zinc octoate (22.5% Zn) — Basic Zinc 2-ethylhexanoate (22.5% Zn)
Barium octoate (10% Ba) — Neutral barium 2-ethylhexanoate (10% Ba)

These Example formulations were prepared by the techniques described earlier. The Example compositions were tested in Formulation D which can be employed for the production of spread flooring top coats.

Formulation D

| Emulsion grade PVC resin (Geon 121) | 100 |
|---|---|
| Dioctyl phthalate | 25 |
| Texanol isobutyrate (TXIB) | 20 |
| Epoxidized soybean oil | 5 |
| Mineral Spirits | 5 |
| Stabilizer | 3 |

The PVC plastisol formulations were converted to PVC films by the technique described for Examples 1–7. Test specimens were punched from these films and subjected to an oven test also as described for Examples 1–7. The oven temperature was 380° F. and samples were removed at fifteen minute intervals. Hunter 'b' values were determined and are shown in Table 7.

TABLE 7

| | Hunter 'b' Values After Oven Test In Minutes | | | | |
|---|---|---|---|---|---|
| Example | 0 | 15 | 30 | 45 | 60 |
| 21 | 2.6 | 7.2 | 34.2 | 52.8 | 81.5 |
| 22 | 2.8 | 5.7 | 24.2 | 36.1 | 47.6 |
| 23 | 2.7 | 4.6 | 15.2 | 25.3 | 41.7 |
| 24 | 2.3 | 4.7 | 15.2 | 26.3 | 39.2 |

Examples 25–27

| Constituent | \multicolumn{3}{c}{Example Compositions} |
|---|---|---|---|
| | 25 | 26 | 27 |
| Weston DHOP | 29.0 | 25.0 | 33.0 |
| Weston 600 | 4.0 | 4.0 | 4.0 |
| Nonyl Phenol | 3.0 | 3.0 | 3.0 |
| Basic Zinc Octoate (18% Zn) | 12.0 | 12.0 | 10.0 |
| Benzoic Acid | 2.0 | 2.0 | 2.0 |
| BNP (28% Ba) | 42.9 | 42.9 | 35.7 |
| Oleic Acid | 4.0 | 4.0 | 4.0 |
| Dibenzoyl Methane | 1.6 | 1.6 | 1.6 |
| Mineral Spirits | 1.5 | 1.5 | 2.7 |
| $Ba(ClO_4)_2$/TPG (8.2% Ba) | — | 4.0 | 4.0 |

Weston DHOP — poly dipropylene glycol phenyl phosphite
Weston 600 — Di-isodecyl pentaerythritol diphosphite These Example compositions were prepared as follows: To a stirred mixture of Weston DHOP, Weston 600 and nonyl phenol was added the basic zinc octoate. The temperature was raised to 160° F. and the benzoic acid added. When this was dissolved was added, carefully, the BNP (28% Ba). Stirring was continued until effervescence had ceased. Oleic acid, dibenzoyl methane and mineral spirits were then charged and homogenized. Finally was added the barium perchlorate/TPG solution. The final mixture was homogenized by agitation at 175° F.

The Example stabilizer compositions were incorporated in the PVC formulation (E) described below by the technique described in Examples 8 and 9.

PVC Formulation E

| Suspension grade PVC resin (Geon 103EP) | 100 |
|---|---|
| Linear 9–11 phthalate | 80 |
| Calcium carbonate | 25 |
| Antimony oxide | 5.0 |
| Zinc borate | 2.5 |
| Epoxidized soybean oil | 3.5 |
| Stearic acid | 0.25 |
| Stabilizer | 1.5 |

The amine stain resistance of these PVC sheets was then determined as follows:

Samples of the sheets were placed in contact with polyurethane foam for seven days at 175° F., and the extent of staining assessed. No evidence of staining warranted a score of "1" whereas a sample which indicated evidence of strong discoloration was rated "10". The following results were obtained:

| Example | Amine Stain Score (1–10) After Seven Days At 175° F. |
|---|---|
| 25 | 6 |
| 26 | 3 |
| 27 | 2 |

Examples 28–32

| | Example Compositions | | | | |
|---|---|---|---|---|---|
| Constituent | 28 | 29 | 30 | 31 | 32 |
| BNP (24% Ba) | 74.00 | 73.93 | 73.86 | 73.80 | 73.73 |
| DPIDP | 17 | 17 | 17 | 17 | 17 |
| DPP | 3 | 3 | 3 | 3 | 3 |
| TPG | 6.0 | 5.87 | 5.74 | 5.60 | 5.47 |
| Ba(ClO$_4$)$_2$/TPG (8.2% Ba) | — | 0.2 | 0.4 | 0.6 | 0.8 |

These Example compositions were prepared by the technique described in Examples 1–7. They were tested in the same fashion and in the same PVC formulation as Examples 1–7. The heat stability test was performed at 380° F. and samples were removed from the oven at ten minute intervals. The results are presented in Table 9.

TABLE 9

| | Hunter 'L' Value After Oven Test In Minutes | | | | | | |
|---|---|---|---|---|---|---|---|
| Example | 0 | 10 | 20 | 30 | 40 | 50 | 60 |
| 28 | 71.5 | 63.6 | 51.0 | 40.2 | 30.0 | 22.2 | 6.9 |
| 29 | 71.3 | 66.2 | 55.4 | 47.6 | 41.8 | 35.1 | 18.5 |
| 30 | 66.5 | 65.3 | 56.7 | 51.9 | 50.9 | 43.0 | 29.9 |
| 31 | 68.5 | 67.6 | 62.5 | 57.0 | 52.8 | 47.8 | 32.2 |
| 32 | 76.5 | 69.6 | 64.7 | 59.9 | 57.9 | 50.4 | 38.5 |

Note: Hunter
L = 100 = white, L = 0 = black

The foregoing Examples have been presented for illustrative purposes only and should not be considered in a limiting sense for that reason. The scope of protection sought is set forth in the claims which follow.

I claim:

1. A homogeneous, clear liquid stabilizer suitable for use in a vinyl chloride polymer consisting essentially of a liquid mixture of (1) at least one metal soap stabilizer and (2) a solubilized metal perchlorate.

2. A stabilizer as claimed in claim 1 wherein the perchlorate comprises a metal which is selected from the group consisting of a Group IA and Group IIA metal from the Periodic Table.

3. A stabilizer as claimed in claim 1 wherein the perchlorate is a Group IIA metal perchlorate.

4. A stabilizer as claimed in claim 1 wherein the metal perchlorate is solubilized in a glycol ether solvent.

5. A stabilizer as claimed in claim 1 wherein the weight ratio of metal soap stabilizer to solubilized metal perchlorate ranges from about 400:1 to about 5:1.

6. A stabilizer as claimed in claim 1 wherein the weight ratio of metal soap stabilizer to solubilized metal perchlorate ranges from about 10:1 to about 6:1.

7. A stabilizer as claimed in claim 3 wherein the perchlorate is barium perchlorate.

8. A stabilizer as claimed in claim 1 which consists essentially of a mixture of barium and zinc soap stabilizers and a solubilized Group IIA metal perchlorate.

9. A stabilizer as claimed in claim 8 wherein the Group IIA metal is barium.

10. A process for forming a homogeneous, clear liquid stabilizer suitable for use in a vinyl chloride polymer which consists essentially of mixture of at least one metal soap stabilizer and a metal perchlorate which process comprises combining a solubilized metal perchlorate and a liquid mixture of the metal soap stabilizer.

11. A process as claimed in claim 10 wherein the perchlorate comprises a metal which is selected from the group consisting of a Group IA and Group IIA metal from the Periodic Table.

12. A process as claimed in claim 10 wherein the perchlorate is a Group IIA metal perchlorate.

13. A process as claimed in claim 10 wherein the metal perchlorate is solubilized in a glycol ether solvent.

14. A process as claimed in claim 10 wherein the weight ratio of metal soap stabilizer to solubilized metal perchlorate ranges from about 400:1 to about 5:1.

15. A process as claimed in claim 10 wherein the weight ratio of metal soap stabilizer to solubilized metal perchlorate ranges from about 10:1 to about 6:1.

16. A process as claimed in claim 12 wherein the perchlorate is barium perchlorate.

17. A process as claimed in claim 10 consists which essentially of a mixture of barium and zinc soap stabilizers and a solubilized Group IIA metal perchlorate.

18. A process as claimed in claim 17 wherein the Group IIA metal is barium.

* * * * *